United States Patent
Kawaguchi et al.

(10) Patent No.: US 10,276,278 B2
(45) Date of Patent: Apr. 30, 2019

(54) SHEET FOR WIRE HARNESS, WIRE HARNESS, AND PRODUCTION METHOD FOR WIRE HARNESS

(71) Applicant: Yazaki Corporation, Tokyo (JP)

(72) Inventors: Kenichiro Kawaguchi, Susono (JP); Mitsunori Tsunoda, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/481,951

(22) Filed: Apr. 7, 2017

(65) Prior Publication Data

US 2017/0213618 A1 Jul. 27, 2017

Related U.S. Application Data

(63) Continuation of application No. 14/379,156, filed as application No. PCT/JP2013/053740 on Feb. 15, 2013, now abandoned.

(30) Foreign Application Priority Data

Feb. 16, 2012 (JP) .................................. 2012-032015

(51) Int. Cl.
*H01B 7/00* (2006.01)
*B60R 16/02* (2006.01)
(Continued)

(52) U.S. Cl.
CPC ....... *H01B 7/0045* (2013.01); *B60R 16/0215* (2013.01); *C09J 7/20* (2018.01);
(Continued)

(58) Field of Classification Search
CPC ............. H01L 51/0097; H01L 27/3276; H01L 2251/5338; B60R 16/0215;
(Continued)

(56) References Cited

U.S. PATENT DOCUMENTS 3,703,605 A * 11/1972 Dembiak ............... H01B 9/022
174/107
4,327,746 A * 5/1982 Feaster .............. A61B 5/15003
600/577
(Continued)

FOREIGN PATENT DOCUMENTS

CN 1322782 A 11/2001
CN 1946549 A 4/2007
(Continued)

OTHER PUBLICATIONS

Communication dated Jul. 4, 2017 issued by the State Intellectual Property Office of the People's Republic of China in counterpart Chinese Patent Application No. 201380009943.4.
(Continued)

*Primary Examiner* — Steven T Sawyer
*Assistant Examiner* — Paresh H Paghadal
(74) *Attorney, Agent, or Firm* — Sughrue Mion, PLLC (57) ABSTRACT

Provided is a wire harness sheet that can be stored in an overlapping manner without using release paper and can be wound in a spiral shape around an electric wire bundle. A wire harness sheet 11 includes a first self-adhesive layer 15 of a sheet base material 13, the first self-adhesive layer 15 being is formed on one surface of a first common region 27, and the other surface of the first common region 27 becoming a first adhesive layer unformed portion 29; and a second self-adhesive layer 17 that is formed on at least part of one surface of a second common region 31.

9 Claims, 8 Drawing Sheets

(51) Int. Cl.
*H01B 13/012* (2006.01)
*H02G 3/04* (2006.01)
*C09J 7/20* (2018.01)
*C09J 7/38* (2018.01)

(52) U.S. Cl.
CPC .......... *C09J 7/38* (2018.01); *H01B 13/01263* (2013.01); *H02G 3/0406* (2013.01); *H02G 3/0487* (2013.01); *B60R 16/0207* (2013.01); *C09J 2201/128* (2013.01); *C09J 2201/28* (2013.01); *C09J 2203/302* (2013.01); *H01B 13/012* (2013.01); *H01B 13/01272* (2013.01); *H02G 3/0481* (2013.01); *Y10T 428/2848* (2015.01)

(58) Field of Classification Search
CPC ....... B60R 16/0207; C09J 7/02; C09J 7/0207; C09J 7/20; C09J 7/38; C09J 2203/302; C09J 2201/28; C09J 2201/128; H01B 13/012; H01B 13/01263; H01B 13/1272; H01B 7/0045; H02G 3/0406; H02G 3/0487; H02G 3/0481; Y10T 428/28; Y10T 428/2848

See application file for complete search history.

(56) References Cited

U.S. PATENT DOCUMENTS

| | | | | |
|---|---|---|---|---|
| 4,406,914 A | * | 9/1983 | Kincaid | H01B 11/1016 174/107 |
| 4,413,656 A | * | 11/1983 | Pithouse | B29C 61/10 138/110 |
| 4,596,897 A | * | 6/1986 | Gruhn | H01B 7/0861 174/115 |
| 6,384,326 B1 | | 5/2002 | McFadden et al. | |
| 6,476,323 B2 | * | 11/2002 | Beebe | B60R 16/0215 138/156 |
| 6,562,455 B2 | | 5/2003 | Tozuka et al. | |
| 6,664,466 B2 | * | 12/2003 | Bailey | H01B 11/1008 174/105 R |
| 7,105,746 B2 | * | 9/2006 | Shimura | H01R 13/648 174/102 R |
| 7,394,017 B2 | * | 7/2008 | Yabe | H02G 3/0481 174/36 |
| 8,815,389 B2 | | 8/2014 | Kulper et al. | |
| 9,062,802 B2 | * | 6/2015 | Lairie | F16L 3/2235 |
| 2001/0041261 A1 | | 11/2001 | Tozuka et al. | |
| 2004/0099426 A1 | * | 5/2004 | Bryl | H02G 15/18 174/350 |
| 2007/0173156 A1 | | 7/2007 | Kulper et al. | |
| 2007/0237936 A1 | | 10/2007 | Kulper et al. | |

FOREIGN PATENT DOCUMENTS

| | | | | |
|---|---|---|---|---|
| EP | 1983627 A2 | 10/2008 | | |
| JP | S 29 11368 Y | 9/1954 | | |
| JP | S51-15163 | * | 5/1974 | ............... C09J 7/02 |
| JP | 51-15163 A | 2/1976 | | |
| JP | S 62-217820 A | 9/1987 | | |
| JP | 11-007856 A | 1/1999 | | |
| JP | 11-008479 A | 1/1999 | | |
| JP | 2000-142645 A | 5/2000 | | |
| JP | 2001-118432 A | 4/2001 | | |
| WO | 02/21539 A1 | 3/2002 | | |

OTHER PUBLICATIONS

Communication issued by the European Patent Office dated Sep. 19, 2017 in counterpart European Patent Application No. 13748972.0.
Office Action dated Jan. 5, 2017, issued by the State Intellectual Property Office of the People's Republic of China in counterpart Chinese Patent Application No. 201380009943.4.
Office Action dated Jul. 28, 2016 issued by the Japanese Patent Office in corresponding Application No. 2012-032015.
Office Action dated Jun. 1, 2016 issued by the State Intellectual Property Office of the People's Republic of China in counterpart Chinese Patent Application No. 201380009943.4.
Office Action dated May 17, 2016, issued by the Japanese Intellectual Property Office in counterpart Japanese Application No. 2012-032015.
Search Report dated Mar. 19, 2013, issued by the International Searching Authority in counterpart International Application No. PCT/JP2013/053740.
Search Report dated Sep. 16, 2015, issued by the European Patent Office in counterpart European Patent Application No. 13748972.0.
Written Opinion dated Mar. 19, 2013, issued by the International Searching Authority in counterpart International Application No. PCT/JP2013/053740.
Communication dated Jul. 17, 2018, issued by the European Patent Office in counterpart European Application No. 13 748 972.0.

* cited by examiner

SHEET FOR WIRE HARNESS, WIRE HARNESS, AND PRODUCTION METHOD FOR WIRE HARNESS

CROSS REFERENCE TO RELATED APPLICATIONS

This is a continuation application of U.S. application Ser. No. 14/379,156 filed Aug. 15, 2014, which is a 371 of Int'l Appl'n No. PCT/JP2013/053740 filed Feb. 15, 2013, which claims priority from Japanese Patent Application No. 2012-032015 filed Feb. 16, 2012. The above-noted applications are incorporated herein by reference in their entirety.

TECHNICAL FIELD

The present invention relates to a sheet for wire harness sheet, a wire harness, and a production method for the wire harness.

BACKGROUND ART

In many cases, a tape is wound around a wire harness including a large number of electric wire bundles wired in a vehicle, so as to bundle and protect the electric wire bundles. In recent years, the tape wrapping is not used for the reduction of working man-hours. A sheet which is bonded to itself for the bundling and protection of the electric wire bundles at once is increasingly used (refer to PTL 1).

An adhesive layer is formed on only one surface of the wire harness sheet. The electric wire bundle is protected by peeling release paper off the wire harness sheet, by setting the electric wire bundle at a designated position on the wire harness sheet, and by bonding together adhesive surfaces.

A self-adhesive sheet is known as the wire harness sheet, and is bonded to itself when the adhesive surfaces are merely joined together. The self-adhesive wire harness sheets can overlap each other without using the release paper, and the self-adhesive wire harness sheet is not bonded to the electric wire bundles. Accordingly, the self-adhesive wire harness sheet has attracted attention in that the self-adhesive wire harness sheet has good handling properties, workability, and environmental protection.

CITATION LIST

Patent Literature

[PTL 1] JP-A-11-7856

SUMMARY OF INVENTION

Technical Problem

Figure 8:
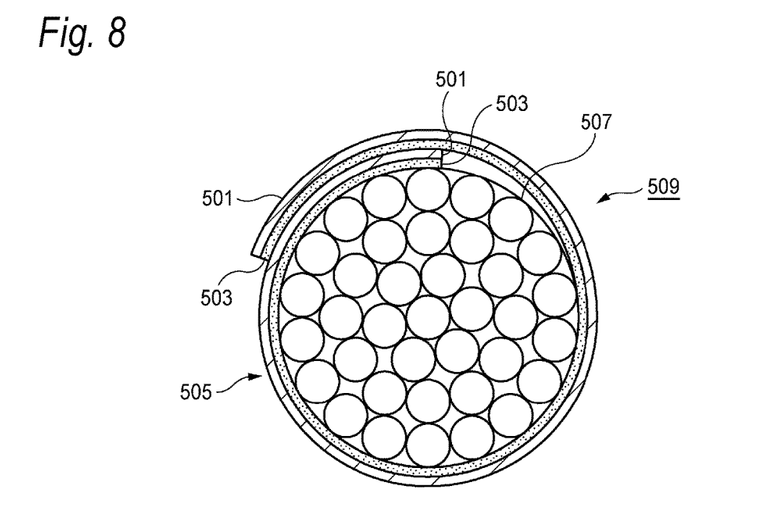
FIG. 8 is a cross-sectional view of a wire harness in which a wire harness sheet of the related art includes a self adhesive on only one surface thereof, and is wound in a spiral shape around the electric wire bundle.

However, as illustrated in FIG. 8, in a self-adhesive sheet 505 in which a self adhesive 503 is provided on only one surface of a sheet base material 501, when the adhesive surfaces are not joined together, it is possible to bond the self-adhesive sheet 505 to itself. Accordingly, the self-adhesive sheet 505 cannot be applied to a wire harness 509, in which the sheet base material is wound in a spiral shape around an electric wire bundle 507 as illustrated in FIG. 8.

Figure 9:
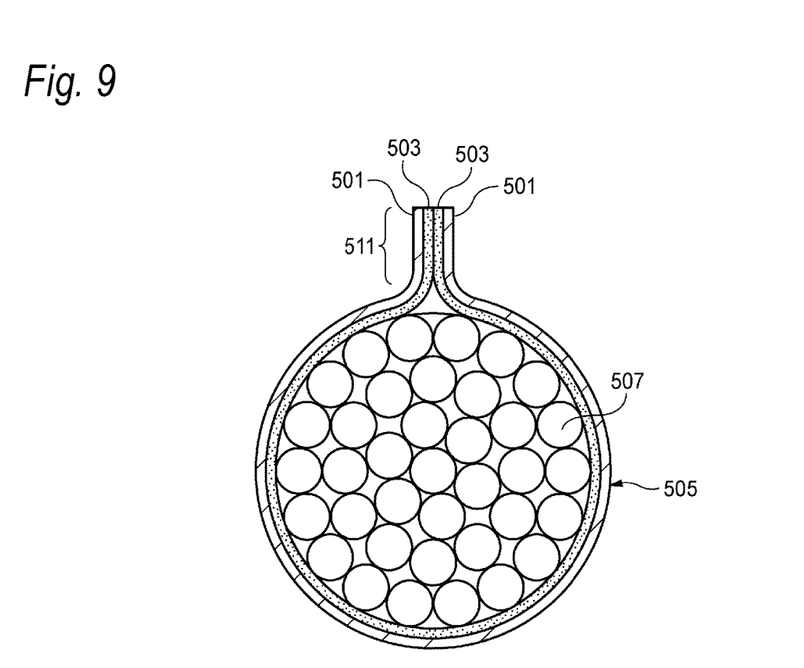
FIG. 9 is a cross-sectional of the wire harness in which the electric wire bundle is protected by bonding together end edge portions of the wire harness sheet of the related art including the self adhesive on only one surface thereof.

In contrast, as illustrated in FIG. 9, when end edge portions are bonded together, it is possible to use the self-adhesive sheet 505 in the wire harness 509. However, it is not possible to use the self-adhesive sheet 505 in a routing portion in which a joining margin 511 is not allowed to protrude.

A double-sided self-adhesive sheet (not illustrated) having the self adhesives 503 on both surfaces can be wound in a spiral shape as illustrated in FIG. 8 so as to solve the above-mentioned problems. However, there is a problem in that the double-sided self-adhesive sheet cannot be stored in a rolled up manner or an overlapping manner, and merits of the self-adhesive sheet cannot be utilized.

The present invention is made in light of the problems, and an object of the present invention is to provide a wire harness sheet, a wire harness and a production method for the wire harness, in which the wire harness sheet can be stored in an overlapping manner without using release paper and can be wound in a spiral shape around an electric wire bundle.

Solution to Problem

The object of the present invention is achieved with the following configurations.

(1) A sheet for a wire harness comprising:
a sheet base material;
a first self-adhesive layer formed on one surface in a first common region of the sheet base material, wherein top and back surfaces of the sheet base material in the first common region exactly overlap each other when the sheet base material is viewed through from top, and the other surface in the first common region is a first adhesive layer unformed portion; and
a second self-adhesive layer formed on at least part of one surface in a second common region of the sheet base material, wherein top and back surfaces of the sheet material in the second common region exactly overlap each other when the sheet base material is viewed through from top, and the first self-adhesive layer is not formed in the second common region.

In the wire harness sheet with the configuration (1), the first and second self-adhesive layers are respectively provided on the back and top surfaces of the sheet base material. However, the first and second self-adhesive layers are respectively provided in the first and second common regions, the top and back surfaces of which exactly overlap each other when the sheet base material is viewed through from above, and which are located in different positions. Accordingly, even when a plurality of the wire harness sheets are stored in an overlapping manner in such a manner that the contours of the wire harness sheets are aligned with each other, respective self adhesives of the self-adhesive sheets vertically overlapping each other do not come into contact with each other, and are not adhesively fixed together.

Since the first and second self-adhesive layers are respectively positioned on the back and top surfaces of the self-adhesive sheet, it is possible to adhesively fix together respective overlapping portions of the first and second self-adhesive layers at a winding end point. In addition, the self-adhesive sheet can be wound in a spiral shape.

(2) The sheet for the wire harness according to the configuration (1), wherein
when the sheet base material is viewed through from top, a gap is provided between the first self-adhesive layer and the second self-adhesive layer.

In the wire harness sheet with the configuration (2), when the sheet base material is viewed through from above, the gap is formed between the first and second self-adhesive layers. Accordingly, in a state where the respective contours of the plurality of sheet base materials stored in an overlapping manner are not aligned with each other, and deviate from each other, when the amount of deviation lies in the gap, the self adhesives of the sheet base materials vertically overlapping each other do not come into contact with each other, thereby being not adhesively fixed together. That is, it is possible to easily store the wire harness sheets in an overlapping up manner by allowing a certain amount of deviation during the overlapping of the wire harness sheets.

(3) A wire harness comprising:
a sheet base material;
a first self-adhesive layer formed on one surface in a first common region of the sheet base material, wherein top and back surfaces of the sheet base material in the first common region exactly overlap each other when the sheet base material is viewed through from top, and the other surface in the first common region is a first adhesive layer unformed portion;
a second self-adhesive layer formed on at least part of one surface in a second common region of the sheet base material, wherein top and back surfaces of the sheet base material in the second common region exactly overlap each other when the sheet base material is viewed through from top, and the first self-adhesive layer is not formed in the second common region; and
an electric wire bundle, wherein
the sheet base material is wound around the electric wire bundle, the winding starts from one end of the sheet base material in a direction in which the first self-adhesive layer and second self-adhesive layer are aligned, and the sheet base material is adhesively fixed to itself at a winding end by the first self-adhesive layer and second self-adhesive layer facing each other.

In the wire harness sheet with the configuration (3), the self-adhesive sheet without using the release paper, being very easy to work with and very easy to store, can be wound in a spiral shape around the electric wire bundle.

Since the sheet base material can be wound in a spiral shape in such a manner that the self adhesive is not exposed to an outer circumferential surface of the wire harness, it is possible to prevent the wire harness from being adhesively fixed to the sheet base material.

(4) A production method for a wire harness in which a sheet for the wire harness is used,
the sheet for the wire harness including:
a sheet base material;
a first self-adhesive layer formed on one surface in a first common region of the sheet base material, wherein top and back surfaces of the sheet base material in the first common region exactly overlap each other when the sheet base material is viewed through from top, and the other surface in the first common region is a first adhesive layer unformed portion; and
a second self-adhesive layer formed on at least part of one surface in a second common region of the sheet base material, wherein top and back surfaces of the sheet base material in the second common region exactly overlap each other when the sheet base material is viewed through from top, and the first self-adhesive layer is not formed in the second common region,
the method comprising:
a step of winding the wire harness sheet around an electric wire bundle from a winding start base point which is in the first adhesive layer unformed portion or a second adhesive layer unformed portion which is on a back side of the second self-adhesive layer.

In the production method for the wire harness with the configuration (4), the wire harness sheet without using the release paper can be used. Accordingly, it is not necessary to peel the release paper off the wire harness sheet, and the storage properties, handling properties, and workability of the wire harness sheet improve.

The wire harness sheet can be environment-friendly since the release paper is not required. Since the electric wire bundle is protected, but is not adhesively fixed to the self adhesive, the position of the electric wire bundle is easily corrected, and the quality of the wire harness improves. The wire harness sheet is wound around the electric wire bundle, having the first or second adhesive layer unformed portion as the winding start base point. Accordingly, the self-adhesive sheet can be wound in a spiral shape around the electric wire bundle. When the length of the first self-adhesive layer is different from that of the second self-adhesive layer in the parallel direction, the wire harness sheet can be wound around the wire harness in different patterns by setting the first or second adhesive layer unformed portion to the winding start base point.

For example, in the wire harness sheet, the width of the first self-adhesive layer is set to be smaller than that of the second self-adhesive layer. When the wire harness sheet is wound around the electric wire bundle, having the first adhesive layer unformed portion as the winding start base point, the wire harness sheet can be wound in a spiral shape in such a manner that the second self-adhesive layer is not exposed on the outer circumference. At this time, the adhesive fixing of the first self-adhesive layer and the second self-adhesive layer is performed only in a single winding.

In contrast, when the wire harness sheet is wound around the electric wire bundle, having the second adhesive layer unformed portion as the winding start base point, the wire harness sheet can be wound in a spiral shape in such a manner that the second self-adhesive layer is exposed on the outer circumference. At this time, since the first self-adhesive layer is exposed to the outside at the winding end point, the adhesive fixing of the wire harness sheet to itself can be performed by using multiple-layer winding.

The present invention has been simply described above. When forms for the implementation of the present invention (hereinafter, referred to as an "embodiment"), which will be described later, are read through with reference to the accompanying drawings, the details of the present invention will become further apparent.

DESCRIPTION OF EMBODIMENTS

Hereinafter, embodiments of the present invention will be described with reference to the accompanying drawings.

Figure 1A:
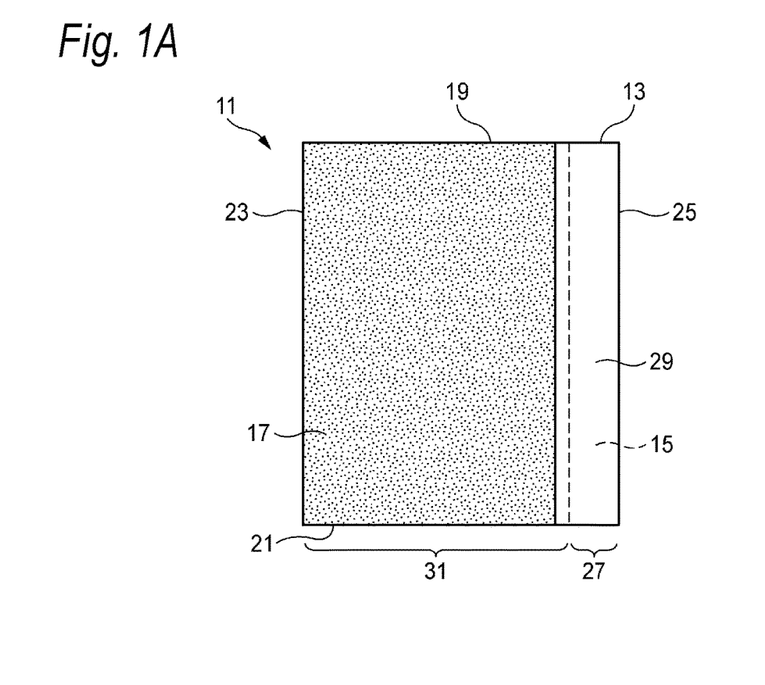
FIG. 1A is a plan view of a wire harness sheet according to a first embodiment of the present invention.
Figure 1B:
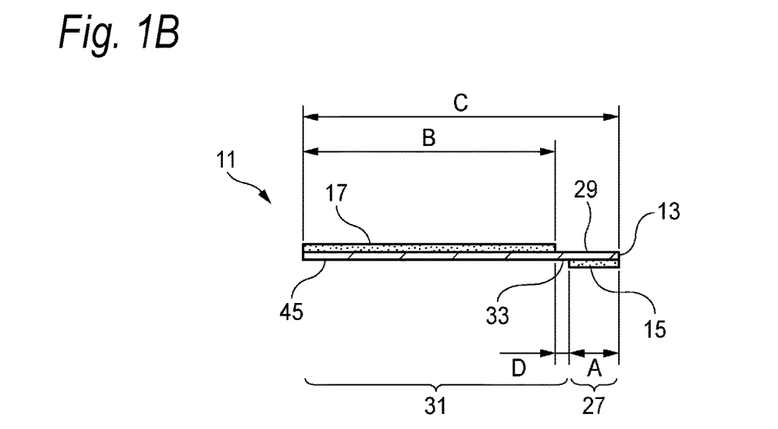
FIG. 1B is a side view of FIG. 1A.

As illustrated in FIGS. 1A and 1B, a wire harness sheet 11 according to a first embodiment is configured to include a sheet base material 13, a first self-adhesive layer 15, and a second self-adhesive layer 17.

The sheet base material 13 of the wire harness sheet 11 has a rectangular shape that is formed by a pair of first side portion 19 and second side portion 21 in parallel with each other, and by a third side portion 23 and a fourth side portion 25 orthogonal to the first side portion 19 and the second side portion 21. The sheet base material 13 can be made of plastic materials, for example, polyolefin resin such as well-known polyethylene and polypropylene, polyurethane resin, polystyrene resin, acrylic resin, polyvinyl chloride resin, and polycarbonate resin.

The first self-adhesive layer 15 is formed on one surface (an upper side in FIG. 1B) of a first common region 27, top and back surfaces of which exactly overlap each other when the sheet base material 13 is viewed through from above, and the other surface (a lower side in FIG. 1B) of the first common region 27 becomes a first adhesive layer unformed portion 29. That is, one surface of the first common region 27 becomes the first non-adhesive formation portion 29, and the other surface becomes the first self-adhesive layer 15. A second self-adhesive layer 17 is formed on at least part of one surface of a second common region 31, top and back surfaces of which exactly overlap each other when the sheet base material 13 is viewed through from above, and in which the first self-adhesive layer 15 is not formed. That the second self-adhesive layer 17 is formed on at least part of one surface indicates that the second self-adhesive layer 17 may be formed on the entirety of one surface of the second common region 31. In the embodiment, when the sheet base material 13 is viewed through from above, a gap 33 is provided between the first self-adhesive layer 15 and the second self-adhesive layer 17. That is, in the embodiment, the second self-adhesive layer 17 is formed on at least the part of one surface of the second common region 31.

When the sheet base material 13 is viewed through from above, the gap 33 is formed between the first self-adhesive layer 15 and the second self-adhesive layer 17 of the wire harness sheet 11. Accordingly, in a state where the respective contours of a plurality of the wire harness sheets 11 stored in an overlapping manner are not aligned with each other, and deviate from each other, when the amount of deviation lies in the gap 33, respective self adhesives of the sheet base materials 13 vertically overlapping each other do not come into contact with each other, thereby being not adhesively fixed together. As a result, it is possible to easily store the wire harness sheets 11 in an overlapping manner by allowing a certain amount of deviation during the overlapping of the wire harness sheets 11.

The wire harness sheet 11 is a self-adhesive sheet that can be bonded to itself only when the first self-adhesive layer 15 and the second self-adhesive layer 17 formed on the sheet base material 13 are joined together. A paste or a binding tape is not required, and it is possible to simply bond the wire harness sheet 11 to itself only by joining together the adhesive surfaces. Furthermore, the first self-adhesive layer 15 and the second self-adhesive layer 17 of the wire harness sheet 11 are special adhesive layers that prevent an electric wire bundle 39 or the operator's hands from bonding thereto, and thus the efficiency of assembly work does not deteriorate. A surface material is laminated on surfaces of the wire harness sheet 11, which respectively become the first adhesive layer unformed portion 29 and a second adhesive layer unformed portion 45 of the sheet base material 13 made of a polypropylene (PP) form material, and the special adhesive layers (the first self-adhesive layer 15 and the second self-adhesive layer 17) are laminated on the other surfaces of the wire harness sheet 11. The following materials can be used as the surface material: kraft paper, a linerboard, a polyethylene-telephthalate (PET) film, a PP film, a non-woven fabric, and the like. The surface material has longitudinal tensile strength of 49 N/cm width, and a lateral tensile strength of 23 N/cm width (per JIS K-6767). The surface material has longitudinal internal tearing strength of 7.8 N, and lateral internal tearing strength of 6.8 N (JIS K-6767). The surface material has a moisture vapor transmission rate of 0.0052 g/cm$^2$·24 hrs (FS-101B), and has an initial adhesive force of 2.5 N/cm width (per a T-type peeling test). For example, it is possible to use Cro-nel (a trademark) made by the Crowell company in the United States or the like as a self-adhesive sheet.

In the wire harness sheet 11 of the embodiment, the length of the first self-adhesive layer 15 is different from that of the second self-adhesive layer 17 in a parallel direction (a direction along which the first side portion 19 and the second side portion 21 are in parallel with each other). For example, the length of the first self-adhesive layer 15 is shorter than that of the second self-adhesive layer 17. When the widths of the sheet base material 13, the first self-adhesive material layer 15, and the second self-adhesive layer 17 are C, A, and B, respectively, C is set to be greater than (A+B), and A is set to be smaller than B. Furthermore, when the gap 33 between the first self-adhesive layer 15 and the second self-adhesive layer 17 has a width of D, C is set to be equal to A+B+D.

Figure 2A:
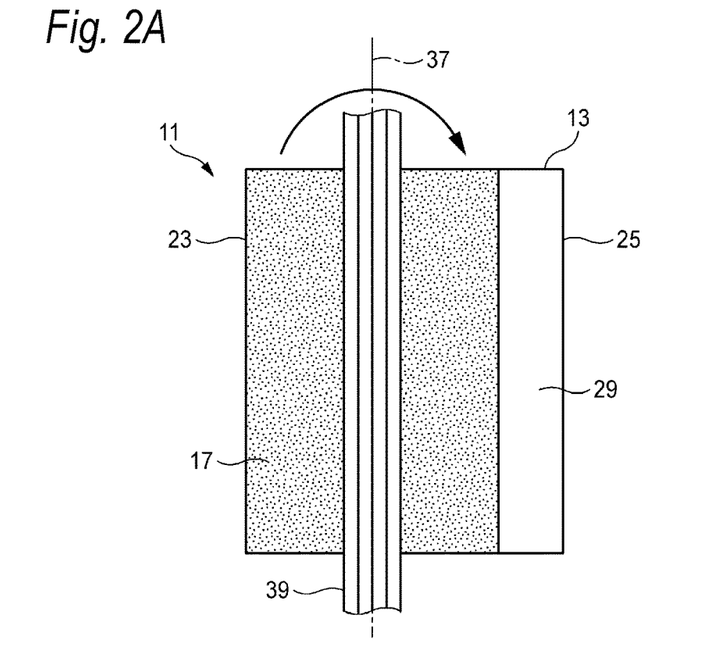
FIG. 2A is a plan view describing a winding start phase in which the wire harness sheet illustrated in FIG. 1A is wound around an electric wire bundle, having a second self-adhesive layer as a winding start base point.

Subsequently, a production method for a wire harness 35 according to the first embodiment with the wire harness sheet 11 will be described with reference to FIGS. 2A to 3.

It is possible to protect the electric wire bundle 39 by bonding end edge portions of the wire harness sheet 11 to each other. At this time, as illustrated in FIG. 2A, the wire harness sheet 11 is placed on a worktable (not illustrated) in such a manner that the second self-adhesive layer 17 becomes a top surface. The electric wire bundle 39 is set at the center of the second self-adhesive layer 17 so as to be parallel with the third side portion 23 and the fourth side portion 25.

Figure 2B:
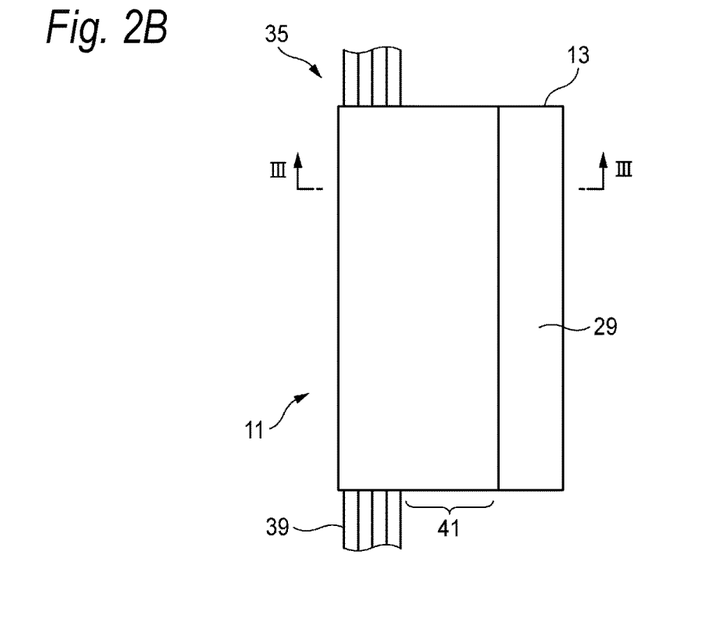
FIG. 2B is a plane view describing a winding end phase.
Figure 3:
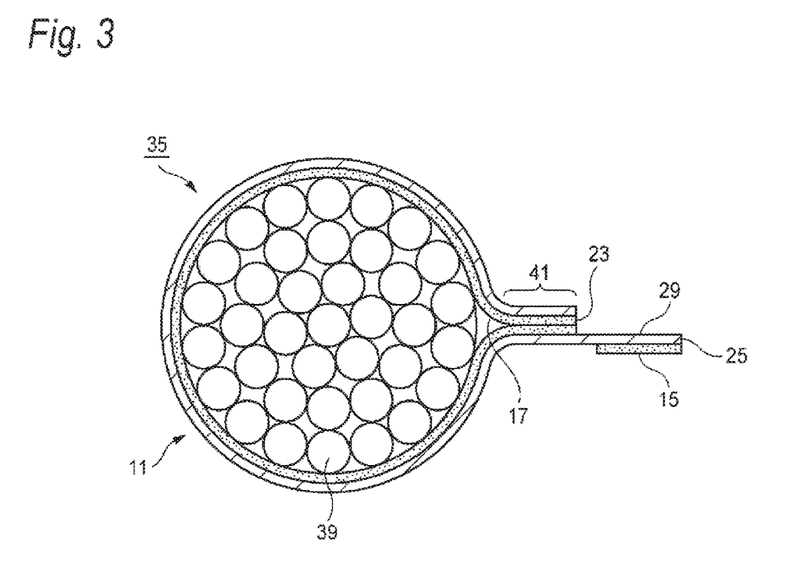
FIG. 3 is a cross-sectional view taken along line III-III in FIG. 2B.

Subsequently, as illustrated in FIG. 2B, the electric wire bundle 39 is fixed by folding the second self-adhesive layer 17 of the sheet base material 13 in half, and by joining together the second self-adhesive layers 17. As illustrated in FIG. 3, in the wire harness 35 manufactured in this manner, the end edge portions are bonded together so that an extending piece portion 41 is formed. The first self-adhesive layer 15 further extends from the extending piece portion 41. In the wire harness 35, the first self-adhesive layer 15 may be cut off.

Subsequently, a production method for a wire harness 43 according to a second embodiment with the wire harness sheet 11 will be described with reference to FIGS. 4A to 5.

Figure 4A:
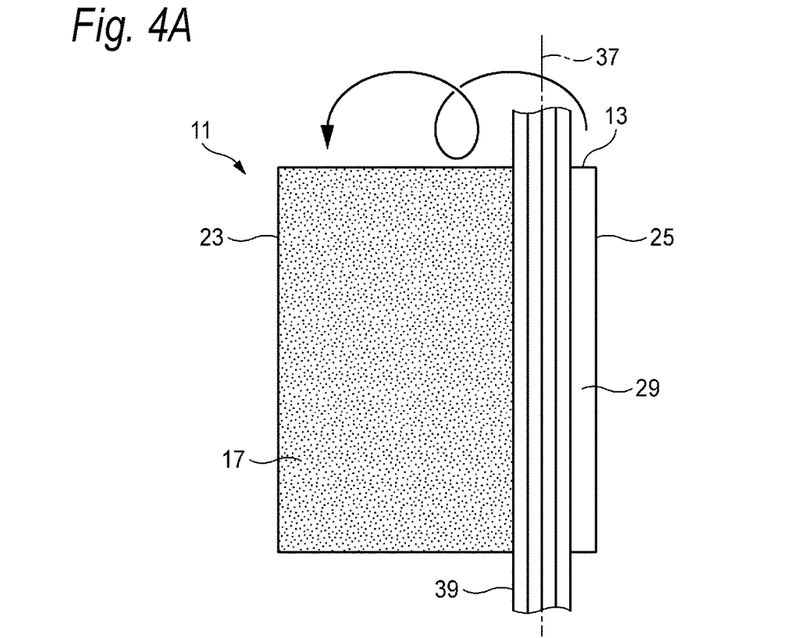
FIG. 4A is a plan view describing a winding start phase in which the wire harness sheet illustrated in FIG. 1A is wound around the electric wire bundle, having a first adhesive layer unformed portion as the winding start base point.
Figure 5:
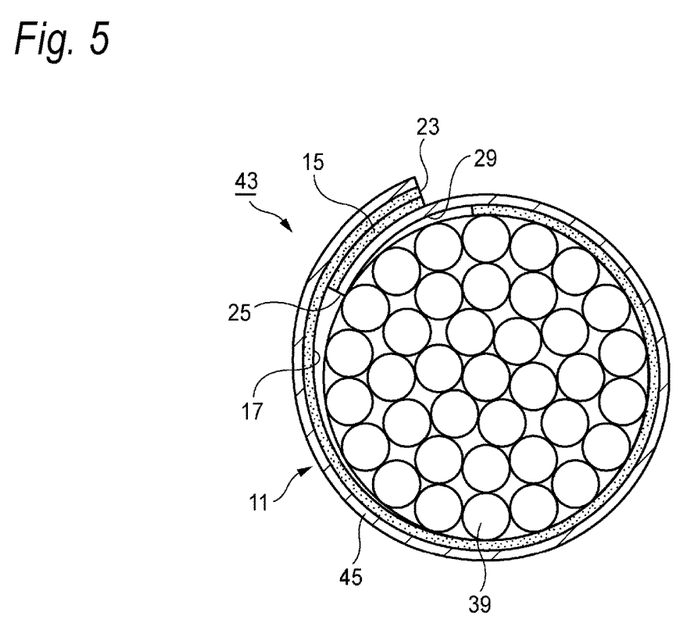
FIG. 5 is a cross-sectional view taken along line V-V in FIG. 4B.

In the production method for the wire harness 43 according to the second embodiment, as illustrated in FIG. 4A, the same wire harness sheet 11 described above is used, and the wire harness sheet 11 is placed on the worktable (not illustrated) in such a manner that the second self-adhesive layer 17 becomes a top surface. The electric wire bundle 39 is set at a right end of the first adhesive layer unformed portion 29 so as to be parallel with the third side portion 23 and the fourth side portion 25.

Figure 4B:
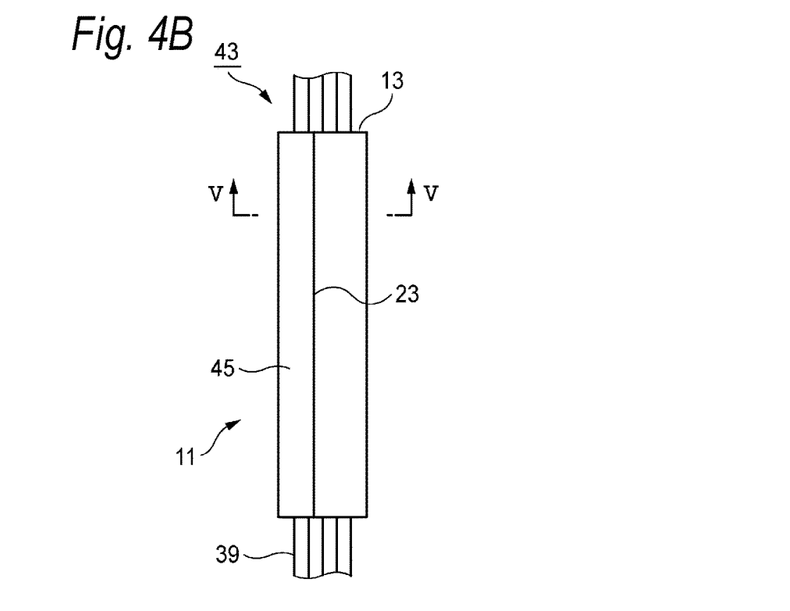
FIG. 4B is a plane view describing the winding end phase.

Subsequently, as illustrated in FIG. 4B, the wire harness sheet 11 is wound in a spiral shape around the electric wire bundle 39, and the electric wire bundle 39 is fixed by bonding the wire harness sheet 11 to itself.

At this time, the first non-adhesive layer formation region 29 becomes a winding start base point 37, and the second self-adhesive layer 17 is adhesive to the first self-adhesive layer 15 at a winding end point, while the second self-adhesive layer 17 is wound around the first self-adhesive layer 15. That is, an outer circumferential surface of the first self-adhesive layer 15 on an inner side of the wound wire harness sheet 11 is set to face an inner circumferential surface of the second self-adhesive layer 17 on an outer side. As illustrated in FIG. 5, the wire harness 43 manufactured in this manner is wound in a spiral shape in which the first self-adhesive layer 15 and the second self-adhesive layer 17 are adhesively fixed together at the winding end point.

In the wire harness sheet 11 of the embodiment, the first self-adhesive layer 15 and the second self-adhesive layer 17 are respectively provided on the back and top surfaces of the sheet base material 13. However, the first self-adhesive layer 15 and the second self-adhesive layer 17 are respectively provided in the first common region 27 and the second common region 31, the top and back surfaces of which exactly overlap each other when the sheet base material 13 is viewed through from above, and which are located in different positions. Accordingly, even when the plurality of wire harness sheets 11 are stored in an overlapping manner in such a manner that the contours of the wire harness sheets 11 are aligned with each other, the respective self adhesives of the sheet base materials 13 vertically overlapping each other do not come into contact with each other, and are not adhesively fixed together. Since the first self-adhesive layer 15 and the second self-adhesive layer 17 are respectively positioned on the back and top surfaces of the sheet base material 13, it is possible to adhesively fix together respective overlapping portions of the first self-adhesive layer 15 and the second self-adhesive layer 17 at the winding end point. In addition, the self-adhesive sheet can be wound in a spiral shape.

In the wire harness 43 of the embodiment, the sheet base material 13 is wound around the electric wire bundle 39, the winding starting from one end of the parallel direction in which the first self-adhesive layer 15 and the second self-adhesive layer 17 are in parallel with each other. In addition, the sheet base material 13 is adhesively fixed to itself at the winding end point by the first self-adhesive layer 15 and the second self-adhesive layer 17 facing each other. In the wire harness 43, the self-adhesive sheet without using the release paper, being very easy to work with and very easy to store, can be wound in a spiral shape around the electric wire bundle 39. Since the sheet base material 13 can be wound in a spiral shape in such a manner that the self adhesive is not exposed to an outer circumferential surface of the wire harness 43, it is possible to prevent the wire harness 43 from being adhesively fixed to the sheet base material 13.

Subsequently, a production method for a wire harness 47 according to a third embodiment with the wire harness sheet 11 will be described with reference to FIGS. 6A to 7.

Figure 6A:
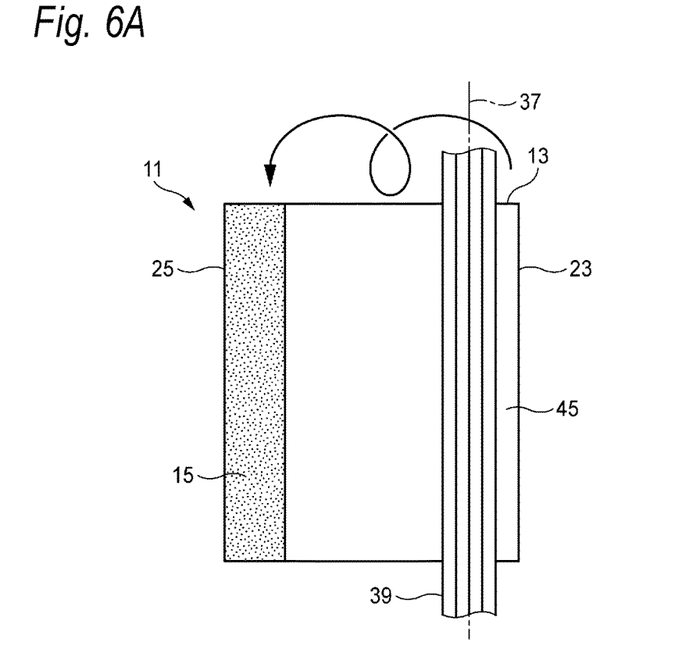
FIG. 6A is a plan view describing a winding start phase in which the wire harness sheet illustrated in FIGS. 1A and 1B is wound around the electric wire bundle, having a second adhesive layer unformed portion as the winding start base point.
Figure 7:
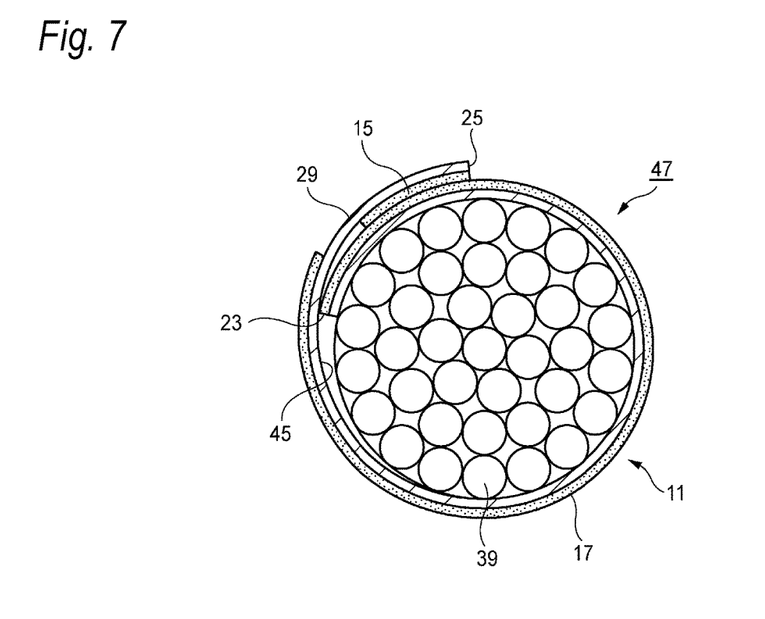
FIG. 7 is a cross-sectional view taken along line VII-VII in FIG. 6B.

In the production method for the wire harness 47 according to the third embodiment, as illustrated in FIG. 6A, the same wire harness sheet 11 described above is used, and the wire harness sheet 11 is placed on the worktable (not illustrated) in such a manner that the first self-adhesive layer 15 becomes a top surface. The electric wire bundle 39 is set at a right end of the second adhesive layer unformed portion 45 so as to be parallel with the third side portion 23 and the fourth side portion 25.

Figure 6B:
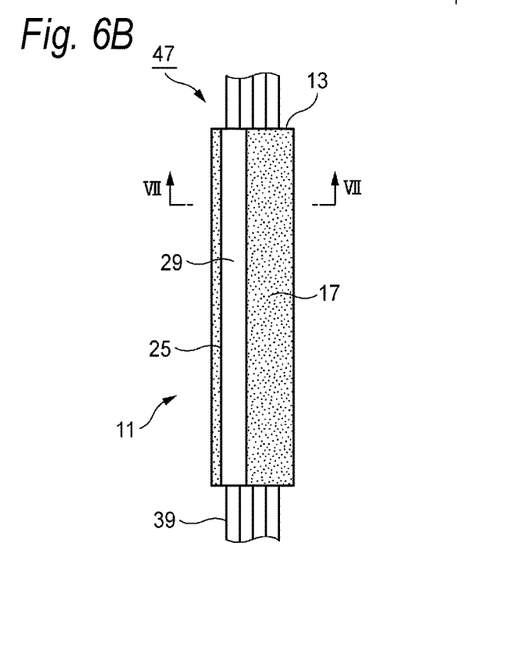
FIG. 6B is a plane view describing the winding end phase.

Subsequently, as illustrated in FIG. 6B, the wire harness sheet 11 is wound in a spiral shape around the electric wire bundle 39, and the electric wire bundle 39 is fixed by bonding the wire harness sheet 11 to itself.

At this time, an end (the third side portion 23) of the second non-adhesive layer formation region 45 becomes the winding start base point 37, and the first self-adhesive layer 15 is adhesive to the second self-adhesive layer 17 at the winding end point, while the first self-adhesive layer 15 is wound around the second self-adhesive layer 17. That is, the outer circumferential surface of the second self-adhesive layer 17 on the inner side of the wound wire harness sheet 11 is set to face the inner circumferential surface of the first self-adhesive layer 15 on the outer side. As illustrated in FIG. 7, the wire harness 47 manufactured in this manner is wound in a spiral shape, in which the second self-adhesive layer 17 is exposed on an outer circumference, and in which the first self-adhesive layer 15 and the second self-adhesive layer 17 are adhesively fixed together at the winding end point. At this time, since the first self-adhesive layer 15 lies at the winding end point, the adhesive fixing of wire harness sheet 11 can be performed by using multiple-layer winding.

In the methods of manufacturing the respective wire harnesses 43 and 47 according to the second embodiment and the third embodiment, the wire harness sheet 11 is used, and the wire harness sheet 11 is wound around the electric wire bundle 39, having the first adhesive layer unformed portion 29 or the second adhesive layer unformed portion 45 on a back side of the second self-adhesive layer 17 as the winding start base point 37. Accordingly, the self-adhesive sheet can be wound in a spiral shape around the electric wire bundle 39.

In the methods of the manufacturing the wire harnesses 35, 43, and 47, the wire harness sheet 11 without using the release paper can be used. Accordingly, it is not necessary to peel the release paper off the wire harness sheet 11, and the storage properties, handling properties, and workability of the wire harness sheet 11 improve.

The wire harness sheet can be environment-friendly since the release paper is not required. Since the electric wire bundle 39 is protected, but is not adhesively fixed to the self adhesive, the position of the electric wire bundle 39 is easily corrected, and the qualities of the wire harnesses 35, 43, and 47 improve.

The wire harness sheet 11 is wound around the electric wire bundle 39, having the first adhesive layer unformed portion 29 or the second adhesive layer unformed portion 45 as the winding start base point 37. Accordingly, the self-adhesive wire harness sheet can be wound in a spiral shape around the electric wire bundle 39. When the length of the first self-adhesive layer 15 is different from that of the second self-adhesive layer 17 in the parallel direction, the wire harness sheet 11 can be wound around the wire harnesses 43 and 47 in different patterns by setting the first adhesive layer unformed portion 29 or the second adhesive layer unformed portion 45 to the winding start base point 37.

For example, in the wire harness sheet 11 according to the embodiments described above, the width of the first self-adhesive layer 15 is set to be smaller than that of the second self-adhesive layer 17 (A<B). As illustrated FIGS. 4A and 4B, when the wire harness sheet 11 is wound around the electric wire bundle 39, having the first adhesive layer unformed portion 29 as the winding start base point 37, the wire harness sheet 11 can be wound in a spiral shape in such a manner that the second self-adhesive layer 17 is not exposed on the outer circumference. At this time, the adhesive fixing of the first self-adhesive layer 15 and the second self-adhesive layer 17 is not performed.

In contrast, as illustrated in FIGS. 6A and 6B, when the wire harness sheet 11 is wound around the electric wire bundle 39, having the second adhesive layer unformed portion 45 as the base point 37, the wire harness sheet 11 can be wound in a spiral shape in such a manner that the second self-adhesive layer 17 is exposed on the outer circumference. At this time, since the first self-adhesive layer 15 is exposed to the outside at the winding end point, the adhesive fixing of the wire harness sheet 11 to itself can be performed by using the multiple-layer winding, in which the wire harness sheets 11 are wound in multiple layers.

Accordingly, in the wire harness sheet 11, the wire harnesses 35, 43, and 47, and the methods of manufacturing the wire harnesses 35, 43, and 47 according to the embodiments, the wire harness sheet 11 can be stored in an overlapping manner without using the release paper, and can be wound in a spiral shape around the electric wire bundle 39.

Hereinbelow, the characteristics of the wire harness sheet, the wire harnesses, and the methods of manufacturing the wire harnesses according to the embodiments of the present invention will be simply summarized in the following paragraphs (i) to (iv).

[i] A wire harness sheet 11 includes:
a sheet base material 13;
a first self-adhesive layer 15 formed on one surface in a first common region 27 of the sheet base material 13, wherein top and back surfaces of the sheet base material 13 in the first common region 27 exactly overlap each other when the sheet base material 13 is viewed through from top, and the other surface in the first common region 27 is a first adhesive layer unformed portion 29; and
a second self-adhesive layer 17 formed on at least part of one surface in a second common region 31 of the sheet base material 13, wherein top and back surfaces of the sheet base material 13 exactly overlap each other when the sheet base material 13 is viewed through from top, and i first self-adhesive layer 15 is not formed in the second common region 31.

[ii] In the wire harness sheet 11 according to [i], when the sheet base material 13 is viewed through from top, a gap 33 is provided between the first self-adhesive layer 15 and the second self-adhesive layer 17.

[iii] Each of wire harnesses 43 and 47 includes:
a sheet base material 13;
a first self-adhesive layer 15 formed on one surface in a first common region 27 of the sheet base material 13, wherein top and back surfaces of the sheet base material 13 in the first common region 27 exactly overlap each other when the sheet base material 13 is viewed through from top, and the other surface in the first common region 27 is a first adhesive layer unformed portion 29;
a second self-adhesive layer 17 formed on at least part of one surface in a second common region 31 of the sheet base material 13, wherein top and back surfaces of the sheet base material 13 in the second common region 31 exactly overlap each other when the sheet base material 13 is viewed through from top, and the first self-adhesive layer 15 is not formed in the second common region 31; and
an electric wire bundle 39, wherein
the sheet base material 13 is wound around the electric wire bundle 39, the winding starts from one end of the sheet base material 13 in direction in which the first self-adhesive layer 15 and the second self-adhesive layer 17 are aligned, and the sheet base material 13 is adhesively fixed to itself at a winding end by the first self-adhesive layer 15 and the second self-adhesive layer 17 facing each other.

[iv] A production method for a wire harness 47 in which a wire harness sheet 11 is used,
the wire harness sheet 11 including:
a sheet base material 13;
a first self-adhesive layer 15 formed on one surface in a first common region 27 of the sheet base material 13, wherein top and back surfaces of the sheet base material 13 exactly overlap each other when the sheet base material 13 is viewed through from top, and the other surface in the first common region 27 is a first adhesive layer unformed portion 29; and
a second self-adhesive layer 17 formed on at least part of one surface in a second common region 31 of the sheet base material 13, wherein top and back surfaces of the sheet base material exactly overlap each other when the sheet base material 13 is viewed through from top, and the first self-adhesive layer 15 is not formed in the second common region 31,
the method including:
a step of winding the wire harness sheet 11 around the electric wire bundle 39 from a winding start base point which is in the first adhesive layer unformed portion 29 or a second adhesive layer unformed portion 45 which is on a back side side of the second self-adhesive layer.

The present invention is not limited to the above-mentioned embodiments. Modifications and improvements can be appropriately made. In addition, insofar as the object of the present invention can be achieved, the material, the shape, the dimension, and the disposition location of each configuration element, the number of the configuration elements, and the like in the above-mentioned embodiments are arbitrarily determined, and are not limited.

The present application claims priority from Japanese Patent Application No. JP-A-2012-032015, filed on Feb. 16, 2012, the disclosure of which is hereby incorporated into the present application by reference.

INDUSTRIAL APPLICABILITY

In the wire harness sheet, the wire harnesses, and the methods of manufacturing the wire harnesses according to the present invention, the wire harness sheet can be stored in an overlapping manner without using the release paper, and can be wound in a spiral shape around the electric wire bundle.

REFERENCE SIGNS LIST

11: wire harness sheet
13: sheet base material

15: first self-adhesive layer
17: second self-adhesive layer
27: first common region
29: first adhesive layer unformed portion
31: second common region
33: gap
37: winding start base point
39: electric wire bundle
45: second adhesive layer unformed portion
35, 43, and 47: wire harness

The invention claimed is:

1. A sheet for a wire harness comprising:
a sheet base material configured to be deformed so as to wrap a bundle of wires, and extending in a wrapping direction for the bundle of wires;
a first self-adhesive layer formed on a first surface of the sheet base material; and
a second self-adhesive layer formed on a second surface of the sheet base material opposite to the first surface, wherein
the first self-adhesive layer is provided inside of a first portion of the sheet base material,
the second self-adhesive layer is provided inside of a second portion of the sheet base material except for the first portion,
the first portion and the second portion are arranged in the wrapping direction, and
a length of the first self-adhesive layer in the wrapping direction is shorter than a length of the second self-adhesive layer in the wrapping direction,
in the wrapping direction, a length between the first self-adhesive layer and the second self-adhesive layer is shorter than the length of first self-adhesive layer,
an extending piece portion is formed by folding the second self-adhesive layer and joining together end edge portions of the second self-adhesive layer so as to wrap the bundle of wires,
a length of the extending piece portion in the wrapping direction is approximately equal to the length of the first self-adhesive layer,
the length of the second self-adhesive layer in the wrapping direction is no longer than a sum of the length of the extending piece portion in the wrapping direction and an circumference of the bundle of wires.

2. The sheet according to claim 1, wherein
a third portion of the sheet base material is defined between the first portion and the second portion.

3. The sheet according to claim 1, wherein
the first self-adhesive layer and the second self-adhesive layer are configured to be adhered and fixed with each other.

4. The sheet according to claim 1, wherein
the sheet base material has a rectangular shape, a first edge and a second edge thereof being opposite to each other, and a third edge and a fourth edge thereof being opposite to each other and connecting the first edge and the second edge,
the first portion includes the first edge, and extends so as to connect the third edge and the fourth edge along the first edge,
the second portion includes the second edge, and extends so as to connect the third edge and the fourth edge along the second edge,
the length of the first self-adhesive layer in the wrapping direction is from the first edge in the wrapping direction,
the length of the second self-adhesive layer in the wrapping direction is from the second edge in the wrapping direction, and
a sum of the length of the first self-adhesive layer in the wrapping direction and the length of the second self-adhesive layer in the wrapping direction is not longer than a length of the third and fourth edges.

5. The sheet according to claim 4, wherein
the length of the first self-adhesive layer in the wrapping direction is shorter than the length of the second self-adhesive layer in the wrapping direction.

6. The sheet according to claim 4, wherein
the sum of the first length and the second length is not equal to the length of the third and fourth edges so that a third portion of the sheet base material is defined between the first portion and the second portion.

7. The sheet according to claim 1, wherein the sheet wraps the bundle of wires such that a longitudinal length of the bundle of wires is perpendicular to the wrapping direction and such that the length of the first self-adhesive layer in the wrapping direction is shorter than a length of the bundle of wires in the wrapping direction and also such that the length of the second self-adhesive layer in the wrapping direction is longer than the length of the bundle of wires in the wrapping direction.

8. The sheet according to claim 7, wherein the length of the second self-adhesive layer in the wrapping direction is longer than a circumference of the bundle of wires, and
the length of the first self-adhesive layer in the wrapping direction is shorter than the circumference of the bundle of wires.

9. The sheet according to claim 1, wherein, in the wrapping direction, the length between the first self-adhesive layer and the second self-adhesive layer is shorter than half of the length of the first self-adhesive layer.

* * * * *